(12) United States Patent
Edelstein et al.

(10) Patent No.: US 10,834,110 B1
(45) Date of Patent: Nov. 10, 2020

(54) METHODS FOR PREVENTING DDOS ATTACK BASED ON ADAPTIVE SELF LEARNING OF SESSION AND TRANSPORT LAYERS AND DEVICES THEREOF

(71) Applicant: F5 Networks, Inc., Seattle, WA (US)

(72) Inventors: Sergei Edelstein, Herzliyya (IL); Michael Kapelevich, Tel Aviv (IL); Shlomo Yona, Kfar Yona (IL); Ron Talmor, Tel Aviv (IL)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 15/382,668

(22) Filed: Dec. 18, 2016

Related U.S. Application Data

(60) Provisional application No. 62/269,676, filed on Dec. 18, 2015.

(51) Int. Cl.
*H04L 29/06* (2006.01)
(52) U.S. Cl.
CPC ...... *H04L 63/1425* (2013.01); *H04L 63/1416* (2013.01); *H04L 63/1458* (2013.01); *H04L 63/20* (2013.01); *H04L 67/42* (2013.01)
(58) Field of Classification Search
CPC ............. H04L 63/1425; H04L 63/1416; H04L 63/1458; H04L 63/20
See application file for complete search history.

(56) References Cited

U.S. PATENT DOCUMENTS

| | | | |
|---|---|---|---|
| 4,783,828 A | 11/1988 | Sadjadi et al. | |
| 5,537,488 A | 7/1996 | Menon et al. | |
| 6,118,893 A | 9/2000 | Li | |
| 6,597,777 B1 * | 7/2003 | Ho | H04L 41/0896 370/235 |
| 6,748,056 B1 | 6/2004 | Capriotti et al. | |
| 6,769,066 B1 | 7/2004 | Botros et al. | |
| 7,228,412 B2 | 6/2007 | Freed | |

(Continued)

OTHER PUBLICATIONS

BIG-IP® Analytics: Implementations, version 11.3, Nov. 15, 2012, F5 Networks, Inc., pp. 1-40.

(Continued)

*Primary Examiner* — Vance M Little
(74) *Attorney, Agent, or Firm* — Troutman Pepper Hamilton Sanders LLP (Rochester)

(57) ABSTRACT

A method, non-transitory computer readable medium, and device includes monitoring a session layer and transport layer network traffic data received from a plurality of client computing devices and plurality of servers. A plurality of network traffic anomaly threshold values and a plurality of server health anomaly threshold values for the monitored session layer and the transport layer network traffic data are estimated. Whether a plurality of current network traffic anomaly values and a plurality of current server health anomaly values for the monitored network traffic data exceeds each of the corresponding estimated plurality of network traffic anomaly threshold values and the estimated plurality of server health anomaly threshold values, and whether the current plurality of network traffic anomaly values and the current plurality of server health anomaly values are not a false anomaly is determined. A mitigation action is initiated based on the determination.

20 Claims, 4 Drawing Sheets

(56) References Cited

U.S. PATENT DOCUMENTS

| | | | |
|---|---|---|---|
| 7,406,606 B2* | 7/2008 | Chawla | H04L 63/1425 713/188 |
| 7,441,429 B1 | 10/2008 | Nucci et al. | |
| 7,519,834 B1 | 4/2009 | Dondeti et al. | |
| 7,624,447 B1 | 11/2009 | Horowitz et al. | |
| 7,743,415 B2 | 6/2010 | Poletto et al. | |
| 8,572,733 B1 | 10/2013 | Rockwood | |
| 8,943,588 B1 | 1/2015 | Speegle | |
| 9,077,709 B1 | 7/2015 | Dall | |
| 9,578,055 B1 | 2/2017 | Khanal | |
| 9,628,499 B1 | 4/2017 | Yu et al. | |
| 9,654,485 B1 | 5/2017 | Neumann | |
| 9,900,344 B2 | 2/2018 | Smith et al. | |
| 9,967,250 B2 | 5/2018 | Johansson et al. | |
| 2002/0116615 A1 | 8/2002 | Nguyen et al. | |
| 2003/0042439 A1 | 3/2003 | Rusu et al. | |
| 2003/0073091 A1 | 4/2003 | Krylov et al. | |
| 2003/0145232 A1 | 7/2003 | Poletto et al. | |
| 2003/0199762 A1 | 10/2003 | Fritz et al. | |
| 2004/0037326 A1 | 2/2004 | D'souza et al. | |
| 2004/0103283 A1 | 5/2004 | Hornak | |
| 2004/0170123 A1 | 9/2004 | Carpenter et al. | |
| 2005/0027846 A1 | 2/2005 | Wolfe et al. | |
| 2005/0111367 A1 | 5/2005 | Jonathan Chao et al. | |
| 2005/0195840 A1 | 9/2005 | Krapp et al. | |
| 2005/0198519 A1 | 9/2005 | Tamura et al. | |
| 2006/0031483 A1 | 2/2006 | Lund et al. | |
| 2006/0031928 A1 | 2/2006 | Conley et al. | |
| 2006/0288411 A1* | 12/2006 | Garg | H04L 63/0236 726/22 |
| 2007/0118894 A1* | 5/2007 | Bhatia | H04L 63/1458 726/13 |
| 2007/0280114 A1 | 12/2007 | Chao et al. | |
| 2007/0294187 A1 | 12/2007 | Scherrer | |
| 2008/0028467 A1* | 1/2008 | Kommareddy | H04L 63/1458 726/23 |
| 2008/0263215 A1 | 10/2008 | Schnellbaecher | |
| 2008/0320567 A1 | 12/2008 | Shulman et al. | |
| 2009/0199297 A1 | 8/2009 | Jarrett et al. | |
| 2010/0031315 A1* | 2/2010 | Feng | G06F 21/554 726/3 |
| 2010/0070451 A1 | 3/2010 | Hugues | |
| 2010/0284282 A1 | 11/2010 | Golic | |
| 2010/0325418 A1 | 12/2010 | Kanekar | |
| 2011/0012586 A1 | 1/2011 | Montanar et al. | |
| 2011/0072516 A1 | 3/2011 | Cohen et al. | |
| 2011/0138463 A1* | 6/2011 | Kim | H04L 63/1425 726/22 |
| 2011/0154026 A1 | 6/2011 | Edstrom | |
| 2011/0264905 A1 | 10/2011 | Ovsiannikov | |
| 2012/0079592 A1 | 3/2012 | Pandrangi et al. | |
| 2012/0144487 A1* | 6/2012 | Kim | H04L 63/1458 726/23 |
| 2012/0167210 A1 | 6/2012 | Oro et al. | |
| 2012/0173710 A1 | 7/2012 | Rodriguez et al. | |
| 2012/0323700 A1 | 12/2012 | Aleksandrovich et al. | |
| 2013/0080407 A1 | 3/2013 | Levow | |
| 2013/0276114 A1 | 10/2013 | Friedrichs et al. | |
| 2014/0095865 A1 | 4/2014 | Yerra | |
| 2014/0289854 A1 | 9/2014 | Mahvi | |
| 2014/0298419 A1 | 10/2014 | Boubez | |
| 2014/0317739 A1 | 10/2014 | Be'Ery et al. | |
| 2015/0026766 A1* | 1/2015 | Holloway | H04L 63/1458 726/1 |
| 2015/0067328 A1 | 3/2015 | Yin | |
| 2015/0088662 A1 | 3/2015 | Noller et al. | |
| 2015/0163234 A1 | 6/2015 | Tal et al. | |
| 2015/0310196 A1 | 6/2015 | Turgeman et al. | |
| 2015/0215334 A1 | 7/2015 | Bingham et al. | |
| 2015/0271179 A1 | 9/2015 | Wang et al. | |
| 2015/0295945 A1 | 10/2015 | Canzanese et al. | |
| 2016/0021117 A1 | 1/2016 | Harmon et al. | |
| 2016/0127406 A1 | 5/2016 | Smith et al. | |
| 2017/0171231 A1 | 6/2017 | Reybok, Jr. et al. | |
| 2017/0249306 A1 | 8/2017 | Allen et al. | |
| 2017/0318053 A1 | 11/2017 | Singh et al. | |
| 2018/0124300 A1 | 5/2018 | Brook | |

OTHER PUBLICATIONS

F5 Networks, "BIG-IP Local Traffic Manager: Concepts", version 11.4, pp. 1-178, retrieved from https://support.f5.com/kb/en-us/products/big-ip_ltm/manuals/product/ltm-concepts-11-4-0.html on Feb. 12, 2015.

F5 Networks, "BIG-IP Local Traffic Manager: Implementations", version 11.4, pp. 1-234, retrieved from https://support.f5.com/kb/en-us/products/big-ip_ltm/manuals/product/ltm-implementations-11-4-0.html on Feb. 12, 2015.

F5 Networks, "BIG-IP Local Traffic Manager: Monitors Reference", version 11.4, pp. 1-106, retrieved from https://support.f5.com/kb/en-us/products/big-ip_ltm/manuals/product/ltm-monitors-reference-11-4-0.html on Feb. 12, 2015.

F5 Networks, "Operations Guide 1.0 F5 Local Traffic Manager and Global Traffic Manager", pp. 1.144, retrieved from https://support.f5.com/kb/en-us/products/big-ip_ltm/manuals/product/f5-ltm-gtm-operations-guide-1-0.html on Feb. 12, 2015.

F5 Networks, "Release Note: BIG-IP LTM and TMOS", version 11.4.1, pp. 1-58, retrieved from https://support.f5.com/kb/en-us/products/big-ip_ltm/releasenotes/product/relnote-ltm-11-4-1.html on Feb. 12, 2015.

F5 Networks, Inc., "BIG-IP Application Security Manager Operations Guide", Manual, Feb. 5, 2016, pp. 1-181, F5 Networks, Inc.

F5 Networks, Inc., "BIG-IP ASM 11.5.0", Release Notes, Apr. 12, 2016, Version 11.5.0.

F5 Networks, Inc., "BIG-IP ASM", Release Notes, Jun. 13, 2016, pp. 1-18, version 11.6.1 F5 Networks, Inc.

F5 Networks, Inc., "BIG-IP® Analytics: Implementations", Manual, Jan. 31, 2014, pp. 1-50, Version 11.5.

F5 Networks, Inc., "BIG-IP® Analytics: Implementations", Manual, Aug. 25, 2014, pp. 1-62, v11.6, F5 Networks, Inc.

F5 Networks, Inc., "BIG-IP® Application Security Manager™: Getting Started", Manual, Aug. 25, 2014, pp. 1-78, version 11.6, F5 Networks, Inc.

F5 Networks, Inc., "BIG-IP® Application Security Manager™: Implementations", Manual, Aug. 25, 2014, pp. 1-420, version 11.6, F5 Networks, Inc.

F5 Networks, Inc., "BIG-IP® Application Security Manager™: Implementations", Manual, Jan. 31, 2014, pp. 1-396, Version 11.5.

F5 Networks, Inc., "BIG-IP® Application Security Manager™: Implementations", F5 Networks, Inc., Dec. 10, 2014, version 11.6, pp. 1-420.

F5 Networks, Inc., "BIG-IP® Local Traffic Management: Basics", Manual, Aug. 25, 2014, pp. 1-74, version 11.6, F5 Networks, Inc.

F5 Networks, Inc., "BIG-IP® Network Firewall: Policies and Implementations", Manual, Aug. 10, 2016, pp. 1-166, v11.6, F5 Networks, Inc.

F5 Networks, Inc., "BIG-IP® Systems: DoS Protection and Protocol Firewall Implementations", Manual, Aug. 25, 2014, pp. 1-108, v11.6, F5 Networks, Inc.

F5 Networks, Inc., "BIG-IP® TMOS®: Concepts", Manual, Nov. 11, 2014, pp. 1-148, Version 11.5.

F5 Networks, Inc., "BIG-IP® TMOS®: Implementations", Manual, Jan. 31, 2014, pp. 1-274, Version 11.5.

F5 Networks, Inc., "F5 BIG-IP TMOS: Operations Guide", Manual, Mar. 5, 2015, pp. 1-276 version 11.6, F5 Networks, Inc.

* cited by examiner

METHODS FOR PREVENTING DDOS ATTACK BASED ON ADAPTIVE SELF LEARNING OF SESSION AND TRANSPORT LAYERS AND DEVICES THEREOF

This application claims the benefit of U.S. Provisional Patent Application Ser. No. 62/269,676, filed Dec. 18, 2015, which is hereby incorporated by reference in its entirety.

FIELD

This technology generally relates to methods and devices for network traffic management and, more particularly, to methods for preventing DDoS attack based on self-adaptive learning of session and transport layers and devices thereof.

BACKGROUND

Many data servers storing data or information, such as web applications, web pages, or other content, require network traffic devices to prevent them from malicious attacks. One such set of malicious attacks are known as distributed denial of service (DDoS) attacks, although many other types of malicious attacks exist. The DDoS attack can be identified based on anomalous network traffic received by the traffic management computing devices, for example. Unfortunately, prior methods of identifying malicious attacks have not been accurate and often occur resulting in the implementation of a mitigation technique on benign traffic.

SUMMARY

A method for preventing distributed denial of service (DDoS) attack implemented by a network traffic management system comprising one or more network traffic apparatuses, client devices, or server devices includes monitoring a session layer and transport layer network traffic data received from a plurality of client computing devices and plurality of servers. A plurality of network traffic anomaly threshold values and a plurality of server health anomaly threshold values for the monitored session layer and the transport layer network traffic data are estimated. When a plurality of current network traffic anomaly values and a plurality of current server health anomaly values for the monitored network traffic data exceeds each of the corresponding estimated plurality of network traffic anomaly threshold values and the estimated plurality of server health anomaly threshold values, and when the current plurality of network traffic anomaly values and the current plurality of server health anomaly values are not a false anomaly is determined. A mitigation action is initiated based on the determination.

A non-transitory computer readable medium having stored thereon instructions for preventing distributed denial of service (DDoS) attack comprising machine executable code which when executed by at least one processor, causes the processor to perform steps including monitoring a session layer and transport layer network traffic data received from a plurality of client computing devices and plurality of servers. A plurality of network traffic anomaly threshold values and a plurality of server health anomaly threshold values for the monitored session layer and the transport layer network traffic data are estimated. When a plurality of current network traffic anomaly values and a plurality of current server health anomaly values for the monitored network traffic data exceeds each of the corresponding estimated plurality of network traffic anomaly threshold values and the estimated plurality of server health anomaly threshold values, and when the current plurality of network traffic anomaly values and the current plurality of server health anomaly values are not a false anomaly is determined. A mitigation action is initiated based on the determination.

A network traffic manager apparatus including one or more processors coupled to a memory and configured to be capable of executing programmed instructions comprising and stored in the memory to monitor a session layer and transport layer network traffic data received from a plurality of client computing devices and plurality of servers. A plurality of network traffic anomaly threshold values and a plurality of server health anomaly threshold values for the monitored session layer and the transport layer network traffic data are estimated. When a plurality of current network traffic anomaly values and a plurality of current server health anomaly values for the monitored network traffic data exceeds each of the corresponding estimated plurality of network traffic anomaly threshold values and the estimated plurality of server health anomaly threshold values, and when the current plurality of network traffic anomaly values and the current plurality of server health anomaly values are not a false anomaly is determined. A mitigation action is initiated based on the determination.

This technology provides a number of advantages including providing methods, non-transitory computer readable media and apparatuses that effectively assist with this technology more accurately identifies malicious network traffic requiring mitigation by cross-referencing with server health when network traffic anomalies are detected and considering periodicity or frequency of historical anomalies. Further, feedback received subsequent to determining an anomaly exists can be used in a learning process to facilitate more effective subsequent analysis of detected anomalies.

DETAILED DESCRIPTION

Figure 1:
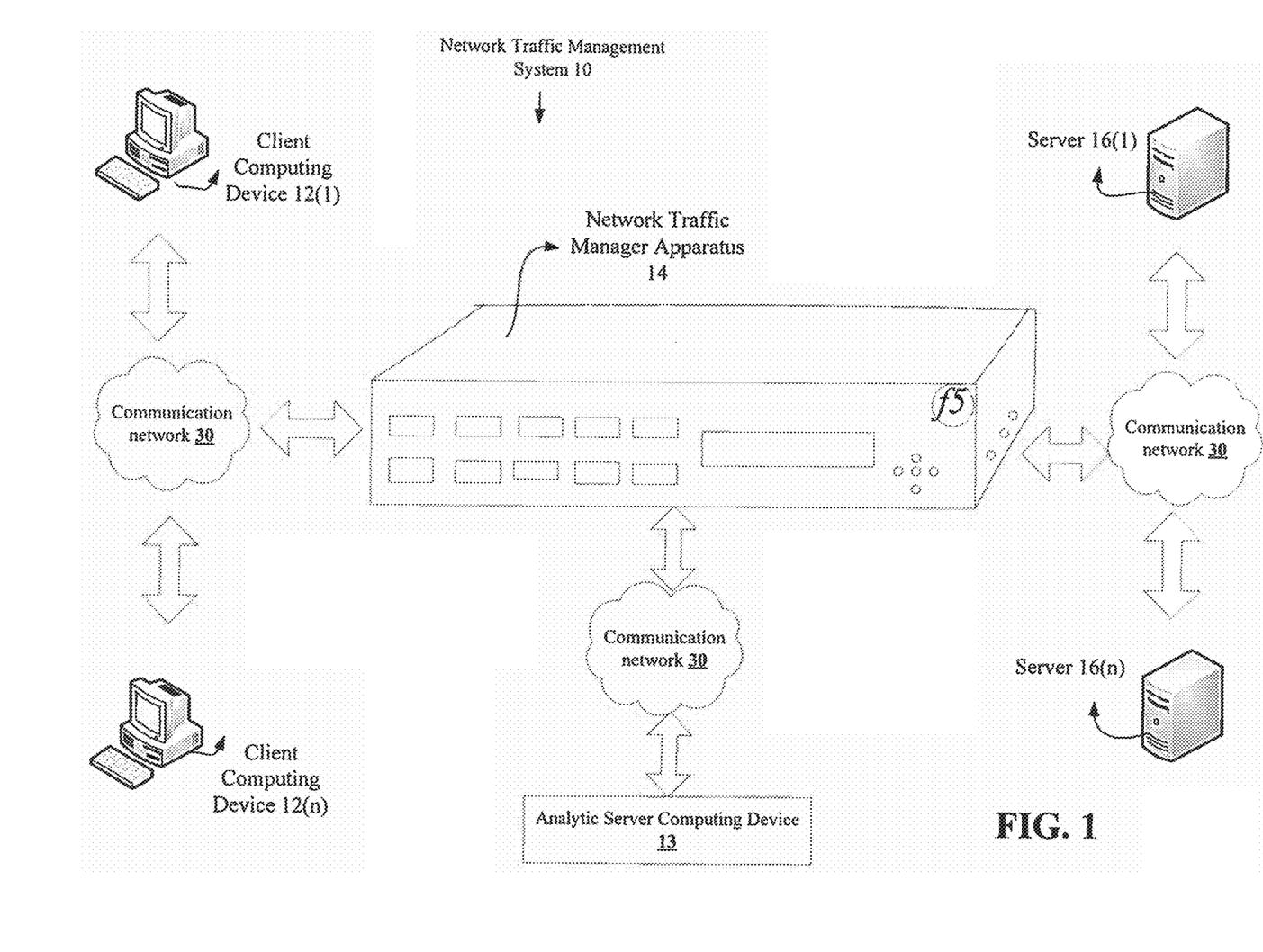
FIG. 1 is an example of a block diagram of an environment including an network traffic manager apparatus for preventing DDoS attack.
Figure 2:
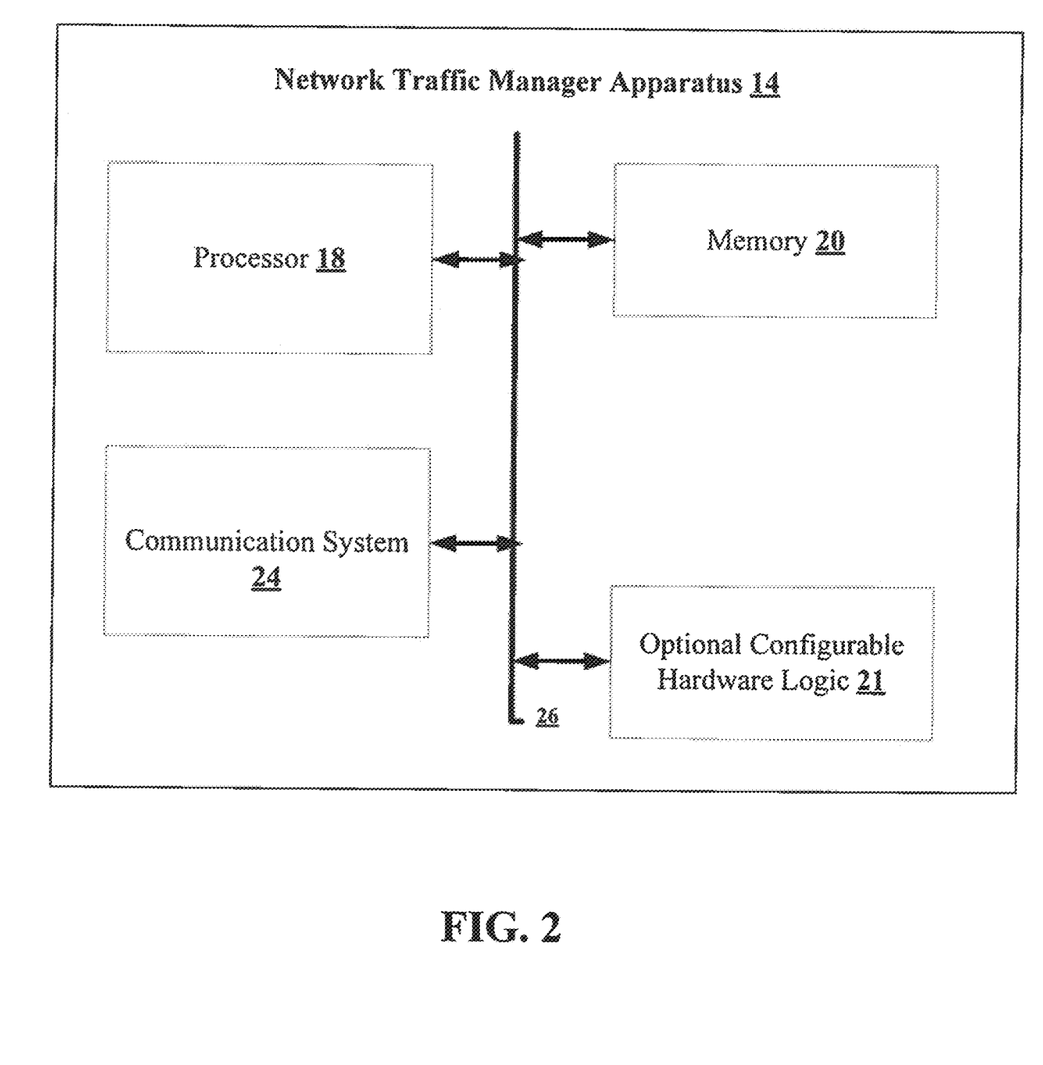
FIG. 2 is an example of a block diagram of the network traffic manager apparatus.

An example of a network environment 10 which incorporates a network traffic management system for preventing distributed denial of service attacks based on adaptive self-learning of session and transport with the network traffic manager apparatus 14 is illustrated in FIGS. 1 and 2. The exemplary environment 10 includes a plurality of client computing devices 12(1)-12(n), an analytic server computing device 13, a network traffic manager apparatus 14, and a plurality of servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including preventing distributed denial of service attacks based on adaptive self-learning of session and transport layers.

Referring more specifically to FIGS. 1 and 2, network traffic manager apparatus 14 of network traffic management system is coupled to the plurality of client computing devices 12(1)-12(n) through the communication network 30, although the plurality of client computing devices 12(1)-12(n), and network traffic manager apparatus 14 may be coupled together via other topologies. Additionally, network traffic manager apparatus 14 is coupled to the plurality of servers 16(1)-16(n) through the communication network 30, although the plurality of servers 16(1)-16(n) and network traffic manager apparatus 14 may be coupled together via other topologies. Further, network traffic manager apparatus 14 is coupled to the analytic server computing device 13 through the communication network 30, although the analytic server computing device 13 and network traffic manager apparatus 14 may be coupled together via other topologies The network traffic manager apparatus 14 assists with preventing distributed denial of service attacks based on adaptive self-learning of session and transport layers as illustrated and described by way of the examples herein, although network traffic manager apparatus 14 may perform other types and/or numbers of functions. As illustrated in FIG. 2, the network traffic manager apparatus 14 includes processor or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus is a PCI Express bus in this example, although other bus types and links may be used.

The processors 18 within the network traffic manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
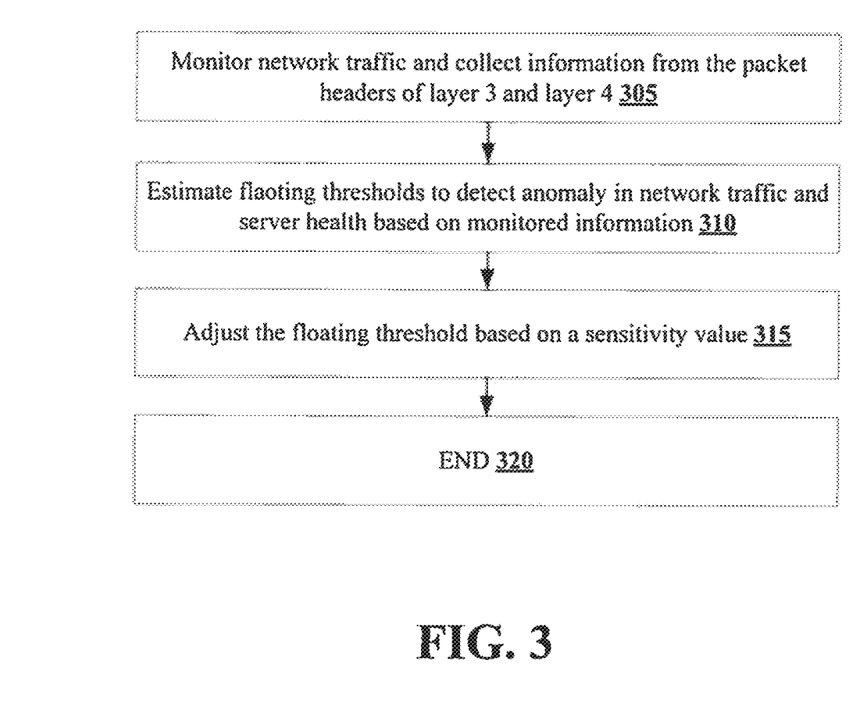
FIG. 3 is an exemplary flowchart of a method for estimating threshold to detect anomalies in network traffic.
Figure 4:
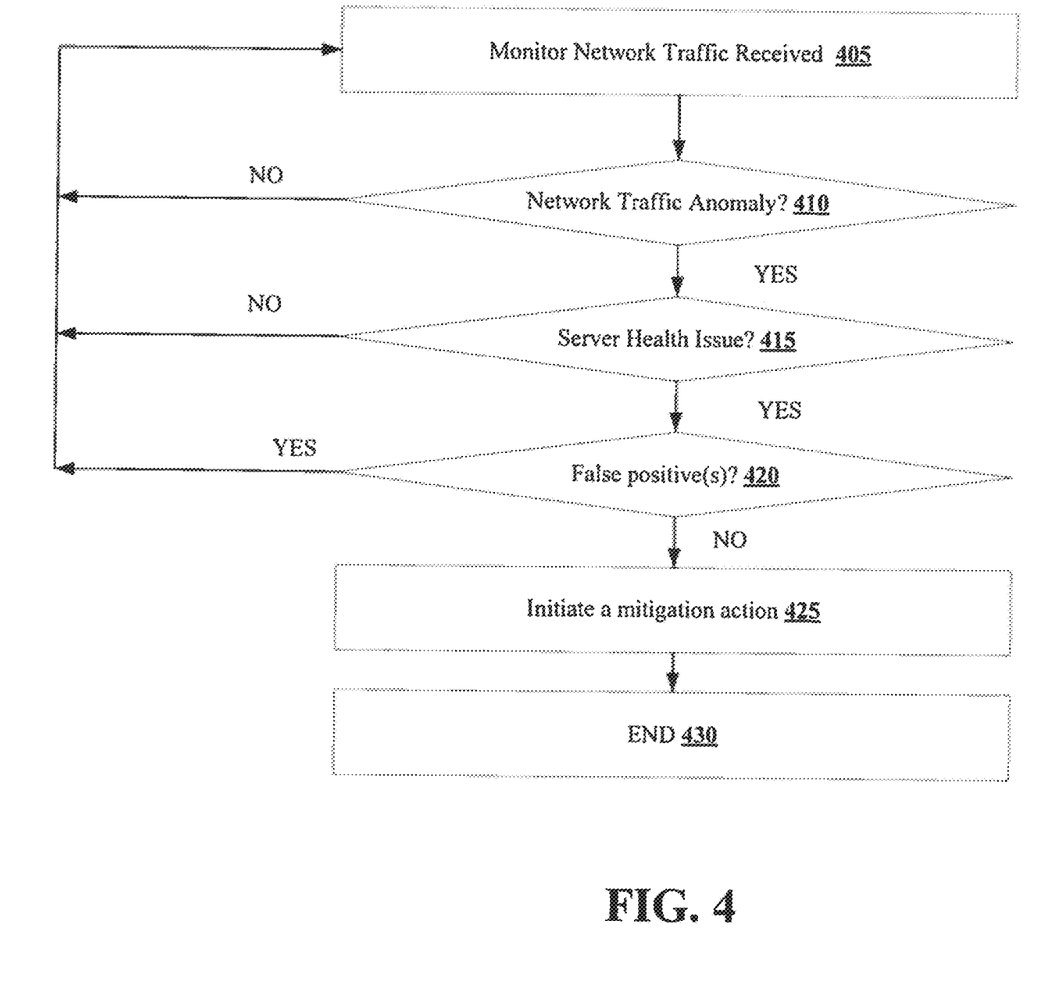
FIG. 4 is an exemplary flowchart of a method for detecting and preventing DDoS attack.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowcharts shown in FIGS. 3-4 are representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 3-4. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the mobile network traffic manager apparatus may be managed or supervised by a hypervisor.

The optional configurable hardware logic device 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the network traffic manager apparatus 14 is used to operatively couple and communicate between the network traffic manager apparatus 14, the plurality of client computing devices 12(1)-12(n), the analytic server computing device 13, and the plurality of servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n) of the network traffic management system, include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the plurality of servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, virtual machines (including cloud-based computer), or the like. Each of the plurality of client computing devices 12(1)-12(n) utilizes the network traffic manager apparatus 14 to conduct one or more operations with the plurality of servers 16(1)-16(n), such as to obtain data from one of the plurality of servers 16(1)-16(n), by way of example only, although other numbers and/or types of systems could be utilizing these resources and other types and numbers of functions utilizing other types of protocols could be performed.

The analytic server computing device 13 of the network traffic management system include a central processing unit (CPU) or processor, a memory, and a communication system, which are coupled together by a bus or other link, although other numbers and/or types of network devices could be used. Generally, the analytic server 13 process requests for providing network traffic related data received from the plurality of client computing devices 12(1)-12(n) and/or the network traffic manager apparatus 14, via the communication network 30 according to the HTTP-based application RFC protocol or the CIFS or NFS protocol in this example, but the principles discussed herein are not limited to this example and can include other application protocols. A series of applications may run on the analytic server computing device 13 that allows the transmission of data requested by the network traffic manager apparatus 14. It is to be understood that the analytic server computing device 13 may be hardware or software or may represent a system with multiple external resource servers, which may include internal or external networks. In this example the plurality of servers 16(1)-16(n) may be any version of Microsoft® IIS servers or Apache® servers, although other types of servers may be used.

Each of the plurality of servers 16(1)-16(n) of the network traffic management system include a central processing unit (CPU) or processor, a memory, and a communication system, which are coupled together by a bus or other link, although other numbers and/or types of network devices could be used. Generally, the plurality of servers 16(1)-16(n) process requests for providing access to one or more enterprise web applications received from the plurality of client computing devices 12(1)-12(n), network traffic manager apparatus 14, via the communication network 30 according to the HTTP-based application RFC protocol or the CIFS or NFS protocol in this example, but the principles discussed herein are not limited to this example and can include other application protocols. A series of applications may run on the plurality servers 16(1)-16(n) that allows the transmission of applications requested by the plurality of client computing devices 12(1)-12(n), or the network traffic manager apparatus 14. The plurality of servers 16(1)-16(n) may provide data or receive data in response to requests directed toward the respective applications on the plurality of servers 16(1)-16(n) from the plurality of client computing devices 12(1)-12(n) or the network traffic manager apparatus 14. It is to be understood that the plurality of servers 16(1)-16(n) may be hardware or software or may represent a system with multiple external resource servers, which may include internal or external networks. In this example the plurality of servers 16(1)-16(n) may be any version of Microsoft® IIS servers or Apache® servers, although other types of servers may be used.

Although the analytic server computing device 13 and the plurality of servers 16(1)-16(n) are illustrated as single servers, one or more actions of the analytic server computing device 13 and each of the plurality of servers 16(1)-16(n) may be distributed across one or more distinct network computing devices. Moreover, the analytic server computing device 13 and the plurality of servers 16(1)-16(n) are not limited to a particular configuration. Thus, the analytic server computing device 13 and the plurality servers 16(1)-16(n) may contain a plurality of network computing devices that operate using a master/slave approach, whereby one of the network computing devices of the analytic server computing device 13 and the plurality of servers 16(1)-16(n) operate to manage and/or otherwise coordinate operations of the other network computing devices. The analytic server computing device 13 and the plurality of servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the analytic server computing device 13 and one or more of the plurality of servers 16(1)-16(n) depicted in FIG. 1 can operate within network traffic manager apparatus 14 rather than as a stand-alone server communicating with network traffic manager apparatus 14 via the communication network(s) 30. In this example the analytic server computing device 13 and the plurality of servers 16(1)-16(n) operate within the memory 20 of the network traffic manager apparatus 14.

While network traffic manager apparatus 14 is illustrated in this example as including a single device, network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, such as one of the analytic server computing device 13, plurality of servers 16(1)-16(n) or, the network traffic manager apparatus 14, or applications coupled to the communication network(s), for example. Moreover, one or more of the devices of network traffic manager apparatus 14 in these examples can be in a same or a different communication network 30 including one or more public, private, or cloud networks, for example.

Although an exemplary network traffic management system 10 with the plurality of client computing devices 12(1)-12(n), the analytic server computing device 13, the network traffic manager apparatus 14, and the plurality of servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as network traffic manager apparatus 14, plurality of client computing devices 12(1)-12(n), the analytic server computing device 13 or plurality of servers 16(1)-16(n), for example, may be configured to operate as virtual instances on the same physical machine. In other words, one or more of network traffic manager apparatus 14, the analytic server computing device 13, plurality of client computing devices 12(1)-12(n), or plurality of servers 16(1)-16(n) illustrated in FIG. 1 may operate on the same physical device rather than as separate devices communicating through a network as depicted in FIG. 1. There may be more or fewer plurality of client computing devices 12(1)-12(n), analytic server computing device 13, network traffic manager apparatus 14, or plurality of servers 16(1)-16(n) than depicted in FIG. 1. The plurality of client computing devices 12(1)-12(n), the analytic server computing device 13, or the plurality of servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method detecting and preventing distributed denial of service (DDoS) attack based on an adaptive self-learning will now be described with reference to FIGS. 1-4. In particular, first an example of a method for estimating threshold to detect anomalies in network traffic will now be illustrated with reference to FIG. 3.

In step 305, the network traffic manager apparatus 14 monitors network traffic received from the plurality of client computing devices 12(1)-12(n) and exchanged with the plurality of server devices 16(1)-16(n) based on the information present in the session layer (layer 3) and transport layer (layer 4) packet headers in real-time, although the network traffic manager apparatus 14 can monitor the network traffic based on other types or amounts of information and/or in other manners. Additionally in this example, while monitoring the network traffic, the network traffic manager apparatus 14 collects and stores the information monitored in the layer 3 and layer 4 packet headers. Further in this example, the network traffic manager apparatus 14 can collect, monitor and store about thirty attributes that are derived from various layer 3 and layer 4 header fields, although the network traffic manager apparatus 14 can collect, store and monitor other number of attributes derived from the layer 3 and layer 4 header fields.

The attributes that are collected, stored and monitored can be classified as reference attributes that relates to the cumulative traffic information such as total number of packets; and protocol attributes, which relates to attributes corresponding to specific feature of network traffic for example TTL, although the collected, stored and monitored information can fall under other types of classifications. For purpose of further illustration and by way of example, the reference attributes can include information associated with number of packets, number of bytes, number of fragments, number of TCP packets, number of TCP bytes, number of packets per flow, number of bytes per flow, number of fragments per flow, and number of blocks per flow, although the reference attributes can include other types or amounts of information. In this example, the protocol attributes can include the internet header length, total length, time to live, number of fragments, type of protocol such as IPv4, TCP, IPv6 that is used, type of service, geographical location of the source internet protocol address, bytes of source address and bytes of source ports, although the protocol attributes can include other type or amounts of information.

Further in this example, the network traffic manager apparatus 14 can collect, monitor and store the information in an observation interval of one to ten seconds, although the network traffic manager apparatus 14 can collect, store and monitor the network traffic at other time intervals. By way of example, the information collected, stored and monitored can include size of the packet, packet flows which are defined by the protocol, source IP address, destination IP address and the delimiter criteria, although other types or amounts of information can be collected, stored and monitored by the network traffic manager apparatus 14. Alternatively in another example, the analytic server computing device 13 can perform the step of collecting, storing the network traffic information illustrated above and the network traffic manager apparatus 14 can obtain this information from the analytic server computing device 13.

Optionally in this example, the network traffic manager apparatus 14 can monitor network traffic from the client-side signal data including number and type of HTTP methods (e.g., GET and POST), web browser type or user agent value, device type (e.g., bots, desktop, or mobile), number or value of HTTP headers, the existence of HTTP headers, or HTTP request content type, for example, although any other client-side signals relating to observed network traffic originating with the client devices can also be used. The server-side signal data can include transactions per second, requests per second, request jitter, response jitter, drops per second, pending transactions per second, bytes in per second, bytes out per second, upload time, download time, idle time, inter-packet time, latency, or response codes, although other signals can also be used. This information observed and monitored from the client-side and the server-side can be restricted to network traffic from a specific application or server or virtual server from the plurality of servers.

Next in step 310, the network traffic manager apparatus 14, estimates a floating threshold for each of the reference attributes and the protocol attributes to detect anomaly in the monitored network traffic and a floating threshold for each of the reference attributes and the protocol attributes to detect an issue in the health of the server, although the network traffic manager apparatus 14 can estimate other types or amounts of thresholds. For purpose of further illustration and by way of example, floating threshold relates to threshold being a range where the threshold can take up any value in the range depending on the network traffic. In this example, the network traffic manager apparatus 14 estimates the floating thresholds by considering two rules including minimizing false positives (detect fewer anomalies) and to detect anomalies precisely during a DDoS attack, although the network traffic manager apparatus 14 can consider other types of rules or parameters while establishing the floating thresholds. Further in this example, the network traffic manager apparatus 14 estimates the floating thresholds for the reference attributes by considering the an upper bound value for the reference attributes that can be identified by based on the capacity of managing network traffic by the plurality of servers 16(1)-16(n). In this example, the protocol attributes takes the corresponding floating threshold value estimated for the reference attributes, although the threshold value for the protocol attributes can be estimated separately in other examples.

Next in step 315, the network traffic manager apparatus 14 can adjust the floating threshold for each of the reference attributes and the protocol attributes based on a sensitivity value that indicates the likelihood of being under a DDoS attack, although the network traffic manager apparatus 14 can adjust the floating threshold based on other parameters. The sensitivity value in this example indicates the likelihood of being under DDoS attack based on entropy changes associated with the reference attributes and protocol attributes, a reference of the sensitivity value, historical sensitivity values for the reference attributes and protocol attributes, historical sensitivity of a virtual server in the plurality of servers and the user defined sensitivity values, although the sensitivity value can consider other types or amounts of information to indicate the likelihood of being under the DDoS attack. The exemplary method ends at step 320.

Now, an example of using the estimated thresholds to detect and prevent DDoS attack will now be illustrated with reference to FIG. 4. In step 405, the network traffic manager apparatus 14 monitors the network traffic received using technique illustrated above in step 305, although the network traffic manager apparatus 14 can use other techniques to monitor the network traffic.

Next in step 410, the network traffic manager apparatus 14 determines whether there is a network traffic anomaly based on the thresholds estimated to detect network traffic anomaly. In this example, the network traffic manager apparatus 14 compares the values of the reference attributes and the protocol attributes of the network traffic that is currently being monitored against the corresponding estimated thresholds values for each of the reference attributes and the protocol attributes to determine whether there is an anomaly in the network traffic, although the network traffic manager apparatus 14 can use other techniques to determine anomaly in network traffic. By way of example, the network traffic manager apparatus 14 determines that there is an anomaly in the network traffic when all the values of the reference attributes and the protocol attributes of the network traffic that are currently being monitored are each above the corresponding estimated thresholds for the reference attributes and the protocol attributes. Alternatively in another example, the network traffic manager apparatus 14 can determine anomaly in network traffic when at least one value of the reference attributes and the protocol attributes of the network traffic that is currently being monitored exceeds the corresponding estimated threshold.

Alternatively, the network traffic manager apparatus 14 can use the technique described and illustrated in U.S. Provisional Patent Application Ser. No. 62/156,968, filed May 5, 2015 and entitled "Methods for Establishing Anomaly Detection Configurations and Identifying Anomalous Network Traffic and Devices Thereof," which is incorporated by reference herein in its entirety, to determine the network anomaly.

Accordingly, when the network traffic manager apparatus 14 determines that there is not currently a network traffic anomaly, then the No branch is taken back to step 405. However, when the network traffic manager apparatus 14 detects a network traffic anomaly, then the Yes branch is taken to step 415.

In step 415, the network traffic manager apparatus 14 cross-references the network traffic anomaly with server health of at least one of the plurality of servers 16(1)-16(n) in order to provide further information regarding whether the detected network traffic anomaly is a malicious attack. Since network traffic anomalies generally result in server health issues, referencing a server health indication provides an indication of whether one or more of the plurality of servers are experiencing health issues as a result of the detected network traffic anomaly. In this example, the network traffic manager apparatus 14 determines that at least one of the plurality of servers 16(1)-16(n) has a server health issue by comparing the current threshold values of the each of the plurality of servers 16(1)-16(n) against the threshold values estimated for the corresponding server of the plurality of servers 16(1)-16(n), although other techniques can be used to detect a server health issue. By way of example, the network traffic manager apparatus 14 determines the server health issue in one of the plurality of servers 16(1)-16(n) when the current threshold value exceeds the estimated threshold value for the corresponding server.

Alternatively, the network traffic manager apparatus 14 can use the technique, as described and illustrated in U.S. Provisional Patent Application Ser. No. 62/156,973, filed May 5, 2015 and entitled "Methods for Analyzing Server Health and Devices Thereof," which is incorporated by reference herein in its entirety, to determine server health anomaly.

Accordingly, if the plurality of servers is not experiencing health issues, then the No branch is taken back to step 405. However, if the network traffic manager apparatus 14 determines that there is a server health issue, then the Yes branch is taken to step 420.

In step 420, the network traffic manager apparatus 14 determines whether there is a false positive based at least in part on a comparison of the layer 3 and layer 4 network data corresponding to the detected network traffic and/or sever health anomaly and layer 3 and layer 4 network data associated with one or more other anomalies indicated in a historical scoreboard database present in the memory of the network traffic manager apparatus 14, although the historical scoreboard database can be present at other memory locations such as that of the analytic server computing device 13. The historical scoreboard database can be used to filter anomalies perceived as an attack but determined based on stored historical anomaly data to be periodic or reoccurring events that are benign. More specifically, in order to determine whether an observed anomaly is a false positive in one example, the network traffic manager apparatus 14 can determine whether a traffic pattern of one or more other corresponding network traffic anomalies is indicated in the historical scoreboard database as preceding server health issue(s). The historical scoreboard database in this example stores data regarding historical observed network traffic anomalies including a time of occurrence and a traffic pattern including layer 3 and layer 4 network data. Accordingly, the network traffic manager apparatus 14 can compare the layer 3 and layer 4 network data used to detect a current network traffic anomaly to the traffic pattern associated with historical network traffic anomalies to determine whether server health anomalies historically resulted from matching ones of the network traffic anomalies. If the network traffic manager apparatus 14 determines that the anomaly is a false positive, then the Yes branch is taken back to step 405. However, if the network traffic manager apparatus 14 determines that the anomaly is not a false positive, then the No branch is taken to step 425. Accordingly, in this example, the network traffic manager apparatus 14 requires that a network traffic anomaly is detected, a server health issue has resulted, and there are no false positives before proceeding to step 425. In other examples the network traffic manager apparatus 14 can proceed to step 425 after the cross-reference with the server health and without confirming there are no false positives.

In step 425, the network traffic manager apparatus 14 initiates a mitigation action. The mitigation action can be initiated, for example, can include blocking network traffic having certain characteristics, intentionally dropping packets from certain of the client devices, presenting certain client devices with challenges before proceeding to accept network traffic in order to confirm whether the plurality of client devices are malicious bots, redirecting network traffic to one or more relatively healthy of the server devices, or any other type of mitigation action intended to defend one or more of the server computing devices. The exemplary method ends at step 430.

As illustrated and described by way of the examples here, this technology more accurately identifies malicious network traffic requiring mitigation by cross-referencing with server health when network traffic anomalies are detected and considering periodicity or frequency of historical anomalies. Further, feedback received subsequent to determining an anomaly exists can be used in a learning process to facilitate more effective subsequent analysis of detected anomalies.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for mitigating distributed denial of service (DDoS) attack implemented by a network traffic management system comprising one or more network traffic apparatuses, client devices, or server devices, the method comprising:
   monitoring network traffic data received from a plurality of client computing devices and plurality of servers;
   identifying a current value corresponding to at least one of a plurality of network traffic attributes based on the monitored network traffic data, wherein the identifying further comprises setting a threshold value that satisfies a plurality of network rules for the at least one of the plurality of network attributes;
   adjusting the determined threshold value corresponding to at least one of the plurality of network traffic attributes based on a sensitivity value determined based on a historical sensitivity value that corresponds to the at least one of the plurality of network traffic attributes;
   identifying an anomaly in the monitored network traffic data when the identified current value exceeds the adjusted threshold value corresponding to the at least one of the determined plurality of network traffic attributes;
   identifying a server health issue associated with at least one of the servers based on the identification of the anomaly in the monitored network traffic data; and
   initiating a mitigation action comprising providing a challenge request in response to a potential DDoS attack based on the identification of the issue in the server health associated with the at least one of the servers.

2. The method as set forth in claim 1 wherein the plurality of network rules comprises a first rule to minimize false positives and a second rule to detect the anomaly in the network traffic data and the server health issue during the DDoS attack.

3. The method as set forth in claim 1 wherein the plurality of network attributes comprises one or more reference attributes and one or more protocol attributes.

4. The method as set forth in claim 3 wherein the anomaly is identified when the identified current value exceeds the adjusted threshold value for both the one or more reference attributes and the one or more protocol attributes.

5. The method as set forth in claim 3 wherein:
   the one or more reference attributes further comprises a number of packets, number of bytes, a number of fragments, a number of TCP packets, a number of TCP bytes, a number of packets per flow, a number of bytes per flow, a number of fragments per flow, or a number of blocks per flow; and
   the one or more protocol attributes further comprises a header length, a time to live, a type of protocol, a type of service, a geographical location of a source internet protocol address, a number of bytes of source address, a number of bytes of source ports.

6. A non-transitory computer readable medium having stored thereon instructions for preventing distributed denial of service (DDoS) attack comprising executable code which when executed by one or more processors, causes the processors to:
   monitor network traffic data received from a plurality of client computing devices and plurality of servers;
   identify a current value corresponding to at least one of a plurality of network traffic attributes based on the monitored network traffic data, wherein the identifying further comprises setting a threshold value that satisfies a plurality of network rules for the at least one of the plurality of network attributes;
   adjust the determined threshold value corresponding to at least one of the plurality of network traffic attributes based on a sensitivity value determined based on a historical sensitivity value that corresponds to the at least one of the plurality of network traffic attributes;
   identify an anomaly in the monitored network traffic data when the identified current value exceeds the adjusted threshold value corresponding to the at least one of the determined plurality of network traffic attributes;

identify a server health issue associated with at least one of the servers based on the identification of the anomaly in the monitored network traffic data; and initiate a mitigation action comprising providing a challenge request in response to a potential DDoS attack based on the identification of the issue in the server health associated with the at least one of the servers.

7. The medium as set forth in claim 6 wherein the plurality of network rules comprises a first rule to minimize false positives and a second rule to detect the anomaly in the network traffic data and the server health issue during the DDoS attack.

8. The medium as set forth in claim 6 wherein the plurality of network attributes comprises one or more reference attributes and one or more protocol attributes.

9. The medium as set forth in claim 8 wherein the anomaly is identified when the identified current value exceeds the adjusted threshold value for both the one or more reference attributes and the one or more protocol attributes.

10. The medium as set forth in claim 8 wherein:
the one or more reference attributes further comprises a number of packets, number of bytes, a number of fragments, a number of TCP packets, a number of TCP bytes, a number of packets per flow, a number of bytes per flow, a number of fragments per flow, or a number of blocks per flow; and
the one or more protocol attributes further comprises a header length, a time to live, a type of protocol, a type of service, a geographical location of a source internet protocol address, a number of bytes of source address, a number of bytes of source ports.

11. A network traffic manager apparatus, comprising memory comprising programmed instructions stored in the memory and one or more processors configured to be capable of executing the programmed instructions stored in the memory to:
monitor network traffic data received from a plurality of client computing devices and plurality of servers;
identify a current value corresponding to at least one of a plurality of network traffic attributes based on the monitored network traffic data, wherein the identifying further comprises setting a threshold value that satisfies a plurality of network rules for the at least one of the plurality of network attributes;
adjust the determined threshold value corresponding to at least one of the plurality of network traffic attributes based on a sensitivity value determined based on a historical sensitivity value that corresponds to the at least one of the plurality of network traffic attributes;
identify an anomaly in the monitored network traffic data when the identified current value exceeds the adjusted threshold value corresponding to the at least one of the determined plurality of network traffic attributes;
identify a server health issue associated with at least one of the servers based on the identification of the anomaly in the monitored network traffic data; and
initiate a mitigation action comprising providing a challenge request in response to a potential DDoS attack based on the identification of the issue in the server health associated with the at least one of the servers.

12. The apparatus as set forth in claim 11 wherein the plurality of network rules comprises a first rule to minimize false positives and a second rule to detect the anomaly in the network traffic data and the server health issue during the DDoS attack.

13. The apparatus as set forth in claim 11 wherein the plurality of network attributes comprises one or more reference attributes and one or more protocol attributes.

14. The apparatus as set forth in claim 13 wherein the anomaly is identified when the identified current value exceeds the adjusted threshold value for both the one or more reference attributes and the one or more protocol attributes.

15. The apparatus as set forth in claim 13 wherein:
the one or more reference attributes further comprises a number of packets, number of bytes, a number of fragments, a number of TCP packets, a number of TCP bytes, a number of packets per flow, a number of bytes per flow, a number of fragments per flow, or a number of blocks per flow; and
the one or more protocol attributes further comprises a header length, a time to live, a type of protocol, a type of service, a geographical location of a source internet protocol address, a number of bytes of source address, a number of bytes of source ports.

16. A network traffic management system, comprising one or more traffic management apparatuses, client devices, or server devices, the network traffic management system comprising memory comprising programmed instructions stored thereon and one or more processors configured to be capable of executing the stored programmed instructions to:
monitor network traffic data received from a plurality of client computing devices and plurality of servers;
identify a current value corresponding to at least one of a plurality of network traffic attributes based on the monitored network traffic data, wherein the identifying further comprises setting a threshold value that satisfies a plurality of network rules for the at least one of the plurality of network attributes;
adjust the determined threshold value corresponding to at least one of the plurality of network traffic attributes based on a sensitivity value determined based on a historical sensitivity value that corresponds to the at least one of the plurality of network traffic attributes;
identify an anomaly in the monitored network traffic data when the identified current value exceeds the adjusted threshold value corresponding to the at least one of the determined plurality of network traffic attributes;
identify a server health issue associated with at least one of the servers based on the identification of the anomaly in the monitored network traffic data; and
initiate a mitigation action comprising providing a challenge request in response to a potential DDoS attack based on the identification of the issue in the server health associated with the at least one of the servers.

17. The system of claim 16, wherein the plurality of network rules comprises a first rule to minimize false positives and a second rule to detect the anomaly in the network traffic data and the server health issue during the DDoS attack.

18. The system of claim 16, wherein the plurality of network attributes comprises one or more reference attributes and one or more protocol attributes.

19. The system as set forth in claim 18 wherein the anomaly is identified when the identified current value exceeds the adjusted threshold value for both the one or more reference attributes and the one or more protocol attributes.

20. The system as set forth in claim 18 wherein:
the one or more reference attributes further comprises a number of packets, number of bytes, a number of fragments, a number of TCP packets, a number of TCP bytes, a number of packets per flow, a number of bytes per flow, a number of fragments per flow, or a number of blocks per flow; and the one or more protocol attributes further comprises a header length, a time to live, a type of protocol, a type of service, a geographical location of a source internet protocol address, a number of bytes of source address, a number of bytes of source ports.

\* \* \* \* \*